US012591222B2

(12) United States Patent
Andreasen et al.

(10) Patent No.: US 12,591,222 B2
(45) Date of Patent: Mar. 31, 2026

(54) FUNCTION SELECTION IN INDUSTRIAL NETWORKS

(71) Applicant: Cisco Technology, Inc., San Jose, CA (US)

(72) Inventors: Flemming Stig Andreasen, Marlboro, NJ (US); Timothy P. Stammers, Raleigh, NC (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 386 days.

(21) Appl. No.: 18/138,458

(22) Filed: Apr. 24, 2023

(65) Prior Publication Data

US 2024/0353817 A1 Oct. 24, 2024

(51) Int. Cl.
*G05B 19/418* (2006.01)
(52) U.S. Cl.
CPC ................................. *G05B 19/4185* (2013.01)
(58) Field of Classification Search
CPC ............ G05B 19/4185; H04L 63/0227; H04L 63/0272; H04L 63/20; H04L 67/12; H04W 48/02
See application file for complete search history.

(56) References Cited

U.S. PATENT DOCUMENTS 10,785,652 B1  9/2020 Ravindranath et al.
11,463,946 B2  10/2022 Dao et al.

2004/0162996 A1* 8/2004 Wallace ................ H04L 63/104
                                                           726/1
2019/0230556 A1* 7/2019 Lee ......................... H04W 28/16
2020/0259896 A1* 8/2020 Sachs ...................... H04L 67/12
2020/0358878 A1* 11/2020 Bansal ................ H04L 63/0876
2021/0092605 A1* 3/2021 Draznin .................. H04W 8/26
2021/0352536 A1* 11/2021 Prabhakar ........... H04L 43/0852
2022/0039177 A1  2/2022 Talebi Fard et al.

FOREIGN PATENT DOCUMENTS

WO        2021032100        2/2021

OTHER PUBLICATIONS

"5G System Overview", online: https://www.3gpp.org/technologies/5g-system-overview, Oct. 11, 2022, accessed Apr. 11, 2023, 10 pages.

* cited by examiner

*Primary Examiner* — Kidest Worku
(74) *Attorney, Agent, or Firm* — Lee & Hayes, P.C.

(57) ABSTRACT

In one embodiment, a device associates available 5G functions stored by a network repository function with contextual information, wherein the contextual information maps each of the available 5G functions with a layer of a hierarchical security model for an industrial network. The device receives a request from a user equipment endpoint to communicate via the industrial network. The device selects a particular user plane function from among the available 5G functions for use by the user equipment endpoint based in part on the layer of the hierarchical security model associated with the particular user plane function. The device causes the user equipment endpoint to communicate via the industrial network using the particular user plane function.

20 Claims, 5 Drawing Sheets

FUNCTION SELECTION IN INDUSTRIAL NETWORKS

TECHNICAL FIELD

The present disclosure relates generally to computer networks, and, more particularly, to function selection in industrial networks.

BACKGROUND

The Internet of Things, or "IoT" for short, represents an evolution of computer networks that seeks to connect many everyday objects to the Internet. The IoT has also expanded to industrial settings as part of the so-called "Industrial IoT" (IIoT) to control manufacturing processes and other operations in industrial settings (e.g., factories, mines, oil rigs, etc.). As a result of this proliferation, the number of external users and services that require access to them has also increased. For instance, a remote technician may wish to connect to a particular IoT device so that they can perform maintenance on it (e.g., updating its firmware, running diagnostics, etc.). While this is a relatively straightforward task in simple network deployments, many IoT and IIoT deployments are multilayered, whereby devices are assigned to different levels/layers and are prevented is from communicating with other devices that are multiple levels above or below them.

With the emergence of fifth generation (5G) cellular networks, recent efforts have focused on extending 5G infrastructure to IoT/IIoT networks, thereby enabling additional applications and higher data rates over legacy networks. Such networks rely on defined network functions, such as user plane functions, to interconnect the mobile network to the existing IoT/IIoT deployment. Presently, though, the selection of a function for a particular data flow does not take into account any service requirements, security requirements, multilayering, etc. of the IoT/IIoT network. As a result, communications between 5G networks and IIoT deployments are plagued by connection failures, service impacts, and security control failures.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
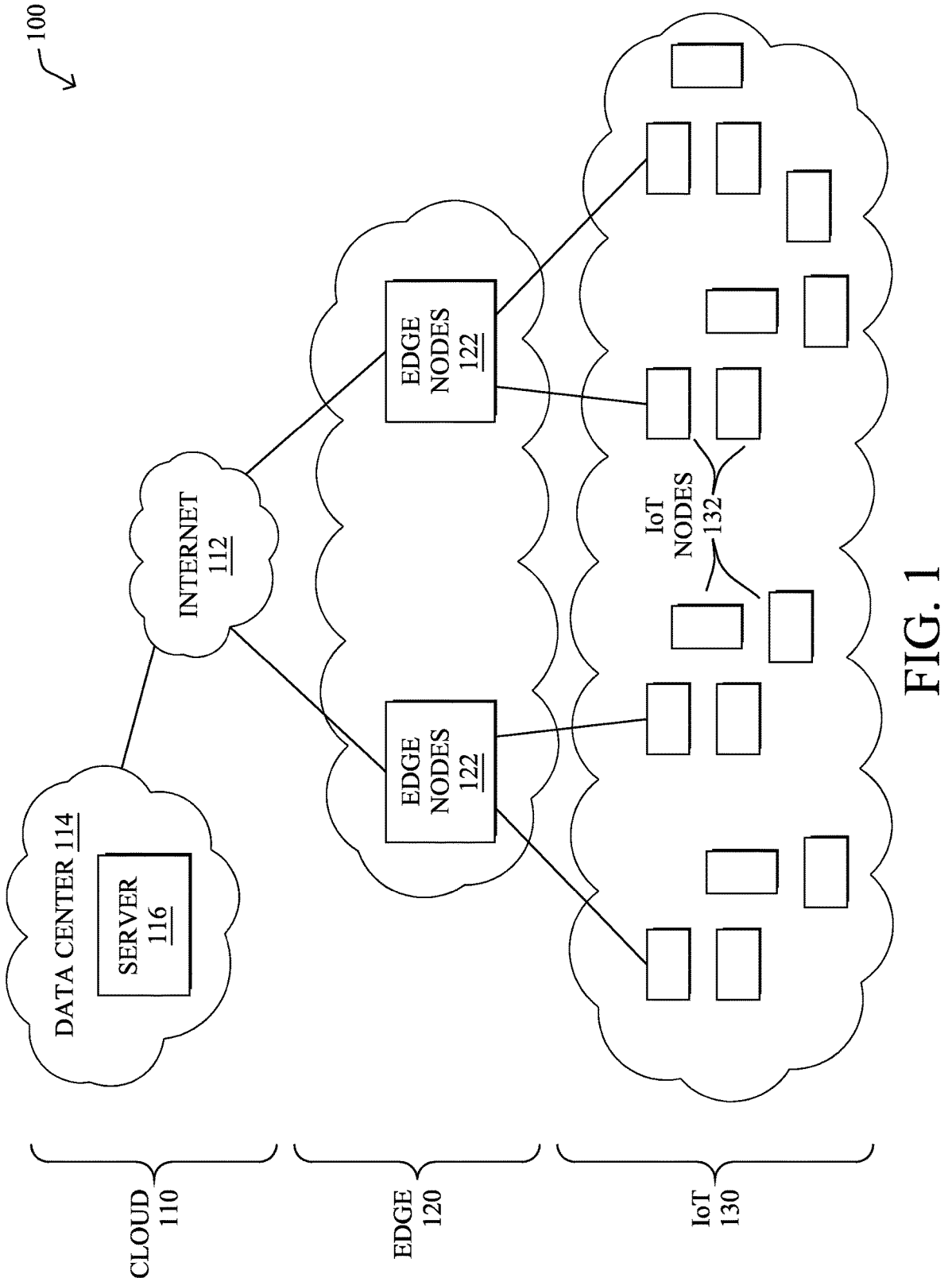
FIG. 1 illustrates an example network.

According to one or more embodiments of the disclosure, a device associates available 5G functions stored by a network repository function with contextual is information, wherein the contextual information maps each of the available 5G functions with a layer of a hierarchical security model for an industrial network. The device receives a request from a user equipment endpoint to communicate via the industrial network. The device selects a particular user plane function from among the available 5G functions for use by the user equipment endpoint based in part on the layer of the hierarchical security model associated with the particular user plane function. The device causes the user equipment endpoint to communicate via the industrial network using the particular user plane function.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or wired networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Edge computing is a distributed approach of cloud implementation that acts as an intermediate layer from local networks (e.g., IoT networks) to the cloud (e.g., centralized and/or shared resources, as will be understood by those skilled in the art). That is, generally, edge computing entails using devices at the network edge to provide application services, including computation, networking, and storage, to the local nodes in the network, in contrast to cloud-based approaches that rely on remote data centers/cloud environments for the services. To this end, an edge node is a functional node that is deployed close to IoT endpoints to provide computing, storage, and networking resources and services. Multiple edge nodes organized or configured together form an edge compute system, to implement a particular solution. Edge nodes and edge systems can have the same or complementary capabilities, in various implementations. That is, each individual edge node does not have to implement the entire spectrum of capabilities. Instead, the edge capabilities may be distributed across multiple edge nodes and systems, which may collaborate to help each other to provide the desired services. In other words, an edge system can include any number of virtualized services and/or data stores that are spread across the distributed edge nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, wired links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, edge layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the edge layer 120, various edge devices 122 may perform various data processing functions locally, as opposed to datacenter/cloud-based servers or on the endpoint IoT nodes 132 themselves of IoT device layer 130. For example, edge devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), or other shared-media protocols where appropriate. In this context, a protocol consists of a set of rules defining how the nodes interact with each other.

Figure 2:
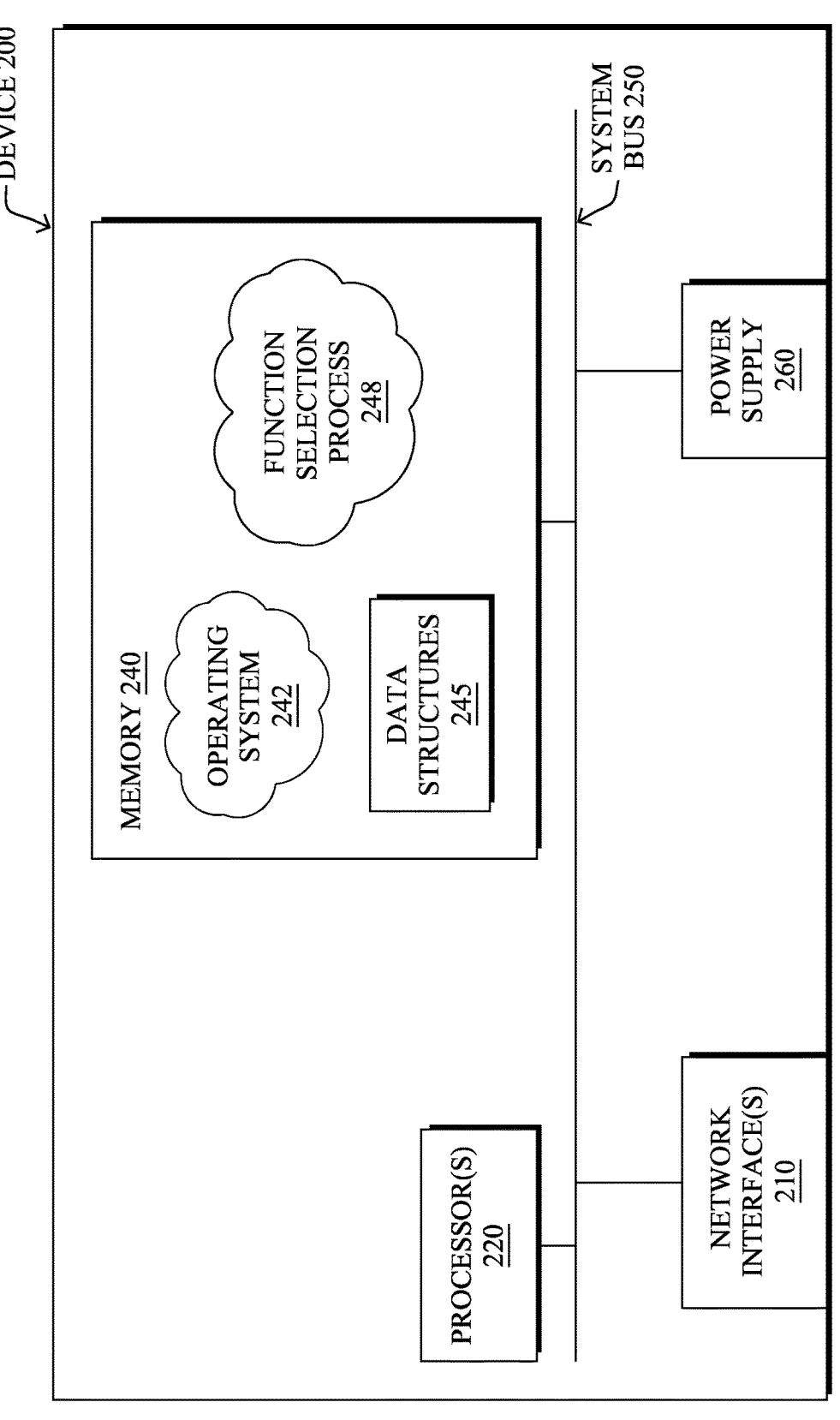
FIG. 2 illustrates an example network device/node.

FIG. 2 is a schematic block diagram of an example node/device 200 (e.g., an apparatus) that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes/services may comprise an illustrative function selection process 248, as described herein.

It will be apparent to those skilled in the art that other processor and memory types, including various computer-readable media, may be used to store and execute is program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, emerging mobile infrastructure network offerings such as private 5G networks are targeting IIoT as a prominent use case. A private 5G deployment model can be a fully on-premises (e.g., installed and running on a company's own hardware or infrastructure) model deployment or be a hybrid model deployment with a functional split between on-premises and cloud-based deployment. In case of the hybrid model deployment, the functional split may be done in different ways. As an example, a 5G function such as the user plane function (UPF) can be on-premises or in the cloud, or even both. The selection of which UPF to use may depend on an endpoint and service in question. For example, URLLC (Ultra-Reliable and Low Latency Communication) typically requires the UPF to be on-premises. Similarly, the access and mobility management function (AMF) and the session management function (SMF) may need to be on-premises as well.

In general, there may be a number of service requirements, such as delay, jitter, reliability, etc. that lead to a particular deployment model for a given endpoint session where different functions are either on-premises or cloud-based. However, IIoT deployments are often more complicated, especially when it comes to industrial automation and control systems (IACS). IACS are generally built around multilayered models (e.g., hierarchical security models). For example, many IACS are built around the Purdue model for control hierarchy which defines different layers in which the different IACS systems are placed (see FIGS. 3A-3B below). These networks may be implemented in accordance with the International Electrotechnical Commission (IEC) 62443 which defines security requirements on top of the multilayer model (e.g., Purdue model, etc.) that prevents devices from talking directly to devices that are multiple layers above or below.

To satisfy both the service requirements (delay, jitter, etc.) as well as the IEC 62443 security requirements, the use of 5G in such an industrial setting involves the deployment of multiple instances of at least the UPF function, and possibly also the SMF and AMF functions. 3rd Generation Partnership Project (3GPP) defines the network function (NF) and NF service discovery and selection procedures, which leverage the network repository function (NRF) where information about the various Network Function instances, such as UPF, SMF and AMF is stored. Today, the NRF and the associated procedures defined in 3GPP technical specification (TS) (e.g., 3GPP TS 23.501 and 3GPP TS 23.502) do not consider the structural and/or operational consideration of multilayered models such as the Purdue model, nor do they consider the associated IEC 62443 security requirements.

For example, 3GPP TS 23.501 defines the overall System Architecture for 5G including the NRF function and associated procedures for selecting particular AMF, SMF and UPF functions and 3GPP TS 23.502 defines various flows associated with this. However, the Network Function (NF) Profile information currently defined and the associated NRF procedures do not consider IEC 62443 security requirements or Purdue model deployment considerations. As a result, there is no existing mechanism to account for these structural and/or operational considerations and security requirements when selecting among multiple 5G function instances in a private 5G deployment. Therefore, a 5G function that is incompatible or suboptimal with these factors may be selected, resulting in detrimental service impacts and security control failures.

——Function Selection in Industrial Networks——

The techniques introduced herein allow for deployment of 5G functions in accordance with the IEC 62443 model. The deployment mechanisms support the cell/zone model and associated security controls per level. For example, the deployment mechanisms facilitate selection of 5G functions which accommodates use of 5G in an industrial setting in a manner that satisfies service requirements as well as security requirements.

Figure 3A:
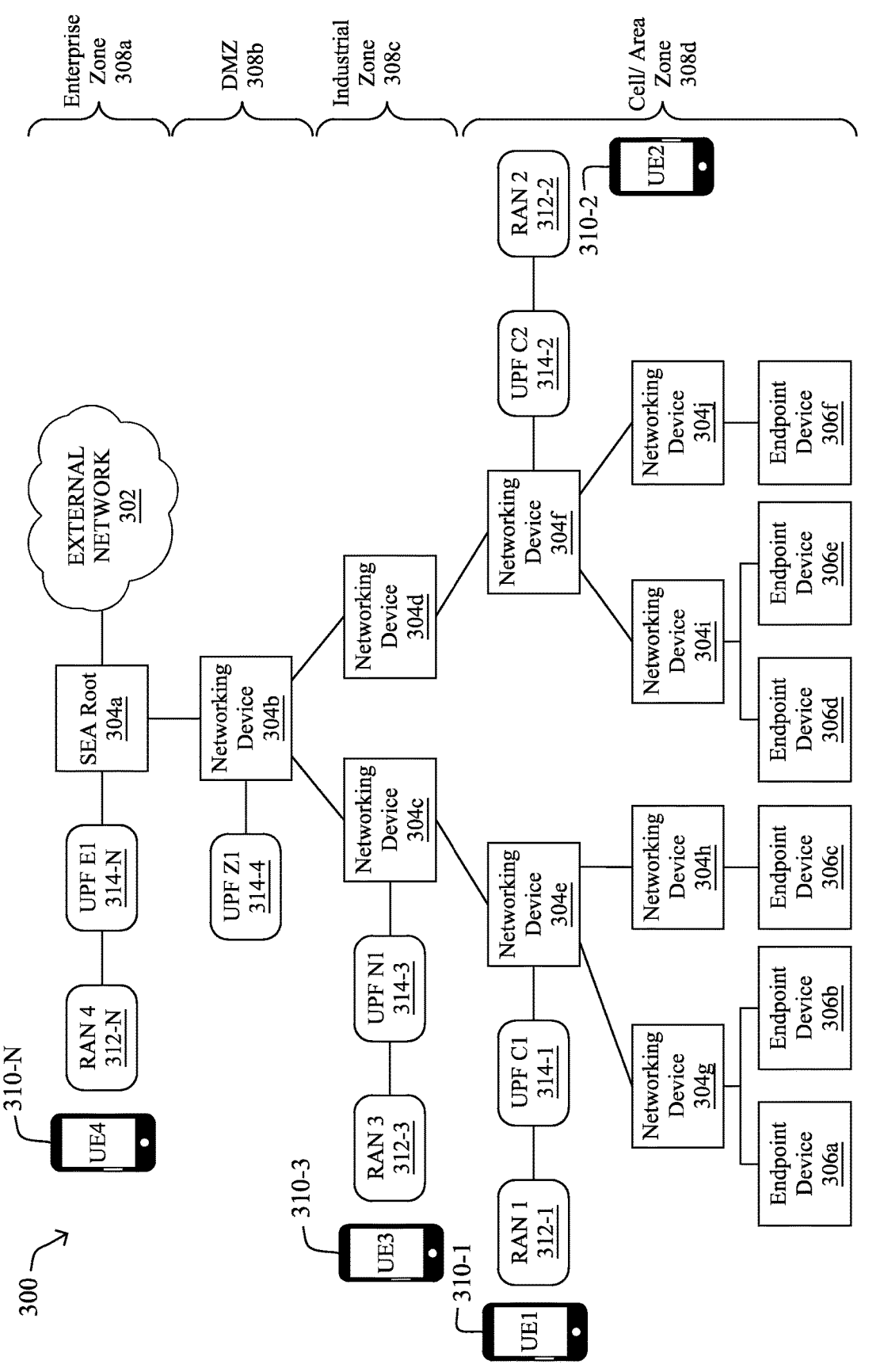
FIGS. 3A-3B illustrate examples of deployments for function selection in an industrial network.
Figure 3B:
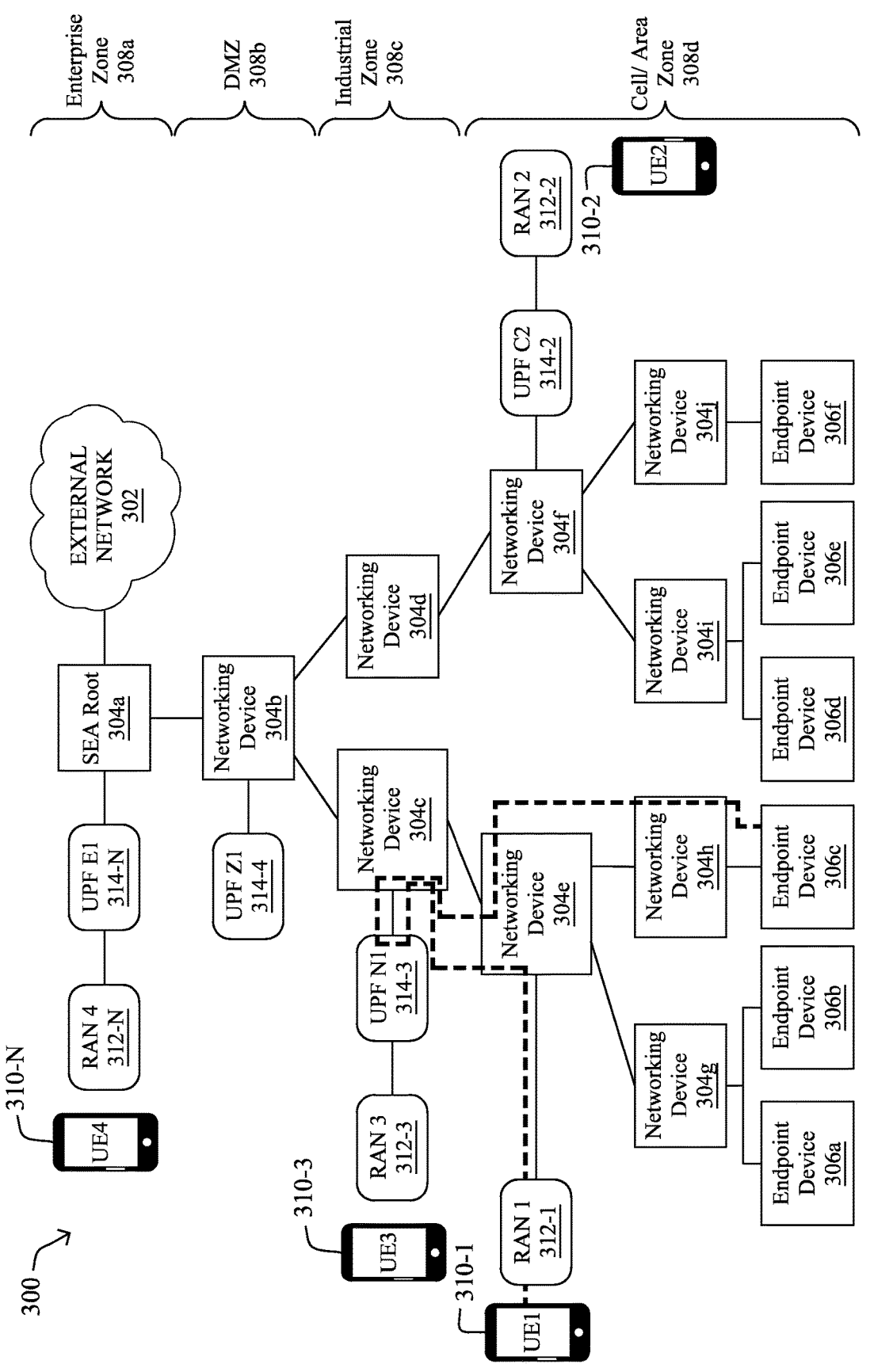

Operationally, FIGS. 3A-3B illustrate examples of deployments for function selection in an industrial network, according to various embodiments. As noted is previously, many IoT and IIoT networks are multilayered in nature. This is done primarily to create layers of security for different portions of a network. For instance, consider the case of a factory having industrial machinery that is controlled via programmable logic controllers (PLCs) that are on the local network. In addition, the factory may also include a number of offices in which users operate personal computers on the local network, to perform their daily tasks. As would be appreciated, these personal computers likely require access to the Internet, to allow their users to perform their daily tasks. However, exposing the PLCs in the same way to the Internet could very well lead to a malicious entity infiltrating them and causing physical damage to their associated machinery (e.g., by burning out a motor, etc.).

Many networks today are implemented in accordance with the International Electrotechnical Commission (IEC) 62443, which is a collection of cybersecurity standards to protect industrial networks. This collection of standards is closely related to the Purdue model, which originated in the early 1990s at Purdue University, with the goal of providing security to networks that include both operations technology (OT) and information technology (IT) networks, as in the above example of a factory. Under the Purdue model, the overall network is segmented into hierarchical layers, with enterprise and business layers existing at the top of the model. These layers primarily support the networking of servers, personal computers, and other IT-related devices. Below these layers is a demilitarized zone (DMZ) layer that exists as the boundary between the IT and OT portions of the network. Lower layers of the hierarchy of the DMZ layer thus include the OT devices of the network and the networking devices that support them. As would be appreciated, other standards or networking models may also be compatible with the techniques herein, so long as the network is organized into a multilayered topology from a security perspective, in further embodiments.

By way of illustration, consider deployment 300 in FIG. 3A of a local network comprising any number of networking devices 304. These networking devices 304 (e.g., devices 304a-304j) may be deployed in accordance with IEC 62443 so as to define a plurality of layers 308, such as any or all or the following:

Enterprise Zone Layer 308a—this layer may support the various IT is endpoints and IT functions for the network, as well as connect the local network to an external network 302, such as the Internet, or the like.

DMZ layer 308b—this layer primarily serves as a divider between the IT portions of the local network and its OT portions. For instance, in the case of a factory, DMZ layer 308b may exist between the personal computers in the offices of the factory and the OT components of the factory, such as its PLCs and networking devices that support the manufacturing equipment therein.

Industrial Zone Layer 308c—this layer may serve as the top layer for the OT portions of the network, thereby connecting any of the lower layer(s) of the OT portions of the network together (i.e., cell/area zones).

Cell/Area Zone Layer 308d—this layer may include different groups of OT devices that have been grouped together into cells/areas. For instance, consider the case in which a factory includes five bays, each of which houses the same type of manufacturing equipment. In such a case, each of these bays may be deployed as separate cells/areas from a networking perspective and implement their own networking policies. In many instances, such cells, bays, etc., may be deployed using a 'cookie-cutter' approach, often by using duplicate IP addresses and overlapping subnets, for easy of deployment.

A multilayered network may be implemented such that a different networking policy is implemented at each layer. For instance, assume that endpoint devices 306a-306f are arranged within different cells. In such a case, the network policies implemented within Cell/Area Zone Layer 308d may prevent one endpoint device from communicating with another endpoint device outside of its own cell. For instance, the networking policy may prevent endpoint device 306a from communicating with endpoint device 306f, as shown in FIGS. 3A-3B.

Typically, such networking policies associated with the different layers (e.g., layers 308) of the network may restrict the set of devices with which a particular device is may communicate, the type of traffic that it may send or receive, the protocols that it may use for its communications, the types of actions that may be performed, etc. These networking policies are typically most restrictive at the lowest layer of the network (e.g., Cell/Area Zone Layer 308*d*), with the highest layer having the least restrictive policy (e.g., Enterprise Zone Layer 308*a*). For instance, while endpoint device 306*a* may be prevented from communicating with other endpoints within Cell/Area Zone Layer 308*d*, endpoint devices within Enterprise Zone Layer 308*a* (e.g., personal computers, etc.) may not have the same restrictions and may even be able to communicate via external network 302.

According to various embodiments, any or all of the networking devices 304 within the network may be configured to support the establishment of a connection between an external client, such as client devices 310 (e.g., 310-1 . . . 310-N), and an endpoint device in the network, such as endpoint device 306*a*. In general, these networking devices 304 may execute specialized software to discover one another and effect the formation of such a connection, which may include selecting a function to manage user plane traffic, process signaling, etc. For instance, such software (e.g., function selection process 248) may take the form of an agent executed by the networking devices 304, functionality built into the operating system of the networking devices 304, or the like.

For example, the deployment 300 may include a private 5g network deployment in an industrial automation and control system (IACS) structured according to the Purdue model. Therefore, the networking devices 304 may comprise and/or be communicatively coupled to a base station, such as a gNodeB (gNB), responsible for radio communication with client devices 310 (e.g., 5G or other computing devices, communication devices, programmable logic controllers, actuators, sensors, etc.) within their coverage area or cell. These base stations may be communicatively coupled to and/or logically located within any of the plurality of layers 308.

The networking devices 304 may be 5G-NR base stations (gNodeB) for communicating with client devices 310 that are located within the vicinity of their signal coverage area. The base station may take digital packets from the network core and is synthesize the corresponding radio signals for transmission. Radio access networks 312 (RAN) may facilitate the connection between the client devices 310 and the core network. While the illustrations of FIG. 3A and FIG. 3B illustrate the described constituent components of deployment 300, their arrangement in the illustration should not be taken as limiting with respect to their localization within deployment 300. For example, although each RAN 312 is not illustrated within the confines of the box outlining the element of its corresponding networking device 304 it should be appreciated that embodiments are contemplated where RAN 312, UPF 314, or other components are part of and/or executed by a corresponding networking device 304.

In addition, functions 314 may be utilized to provide the radio access network/Data network interconnect, perform packet inspection and application detection, perform packet routing and data forwarding, perform QoS management and usage reporting, etc. The functions 314 may be 5G functions. For instance, the functions 314 may include a collection of user plane functions (UPF) that acts as forwarding engines for user traffic of each client device 310 allowing packet processing and traffic aggregation to be performed closer to a network edge.

These devices may also participate in the formation of a proxy chain across the different layers (e.g., layers 308) of the network, in order to support the connection. More specifically, since the networking policies associated with the different layers would normally prevent such a connection from being formed, certain ones of the networking devices 304 may act as proxies that convey the traffic between different layers (e.g., through the formation of one or more tunnels along the proxy chain).

Deployment 300 includes two cells which may correspond to Purdue Model Layers 0-2. Each of the cells has a respective client device 310, radio access network 312, and a function 314. For example, a first cell (C1) may have a first client device 310-1 (which may be a 5G user endpoint (UE)), a first radio access network 312-1 (which may be a 5G RAN), and a first function 314-1 (which may be a UPF function). Likewise, a second cell (C2) may have a second client device 310-2 (which may be a 5G user endpoint (UE)), a second radio access network 312-2 (which may be a 5G RAN), and a second function 314-2 (which may be a UPF function).

Similarly, the Industrial Zone Layer 308*c* (e.g., Layer 3) may have a third client device 310-3, a third radio access network, and/or a third function 314-3 (which may be a UPF N1 function). The industrial DMZ layer 308*b* may have a fourth function 314-4 (which may be a UPF Z1 function). Lastly, the Enterprise Zone Layer 308*a* may have a fourth client device 310-N (which may be a 5G user endpoint (UE)), a fourth radio access network 312-N (which may be a 5G RAN), and a fifth function 314-N (which may be a UPF function E1).

When client devices 310 connect to a network there may be several differing choices of available functions 314 from which to choose. For example, a first client device 310-1 may utilize the first function 314-1, the second function 314-2, the third function 314-3, the fourth function 314-4, and/or the fifth function 314-N to connect to the network. The question is, which of these should be used for a particular session? The answer may be determined by execution of a function selection process 248 at one or more of networking devices 304 and/or a communicatively coupled network controller or computing device based on several characteristics of the client device 310, the application flow(s) to support, and/or the security policies that are in place in the network.

For example, deployment 300 includes functions 314 at each layer of the multilayer network. In order to facilitate selection of a particular one of the functions 314 the network repository function (NRF) and associated network function (NF) selection procedures may be enhanced with contextual information about where each of the functions 314 is located (e.g., which level in a multilayer model, which Purdue operational technology (OT) level, etc.) and/or which cell each of the functions 314 and the endpoint device in question resides in.

This approach exposes the contextual information for reference in selecting a particular function. This contextual information may then be available to determine whether one or more of the functions 314 satisfies the IEC 62443 security requirements for the end point device and/or data flow in question. For example, a particular UPF may be selected as the data forwarding plane for a 5G data communication from a particular is 5G user endpoint client device to a particular endpoint device on the core network based on that particular UPF satisfying the security requirements for such communications to/from the particular endpoint device. As a result, this will typically result in the selection of a particular function that is closest to the particular client device, thereby minimizing any potential delay and jitter impacts which are often important in delay-sensitive IACS.

Functions 314 are typically associated to particular layers 308 (e.g., multilayer model levels such as Purdue levels)

and/or cells or zones within those layers 308 manually. However, by leveraging the aforementioned contextual information about the multilayer OT network itself, this association may be automated. For example, an IIoT cyber-security and/or network management platform (e.g., Cisco Cyber Vision (CCV), etc.) may be associated with the execution of the function selection process 248. The platform may execute this process to profile the devices (e.g., networking devices 304, endpoint devices 306, etc.) of the OT network devices and their communications and organize the devices into particular logical groups. The logical groups may correspond to cells, zones, etc. of a multilayer model. In addition, execution of the process may include profiling of the functions 314 by the platform. Therefore, each of the functions 314 may be organized into a particular logical group. In generally, the platform may be enabled on egress of each of the functions 314 (e.g., towards the network).

A database may be maintained by the platform in order to store and/or expose stored contextual information about the network, its devices, functions, etc. The database may be contacted by a session management function (SMF) to determine an appropriate security control for a relevant client device attempting to establish an IP session (e.g., when the relevant client device attaches to a network and/or a UPF initially to obtain an IP address), such as when attempting to establish communication with an endpoint device. With this information, the SMF may signal the relevant gNB and apply the correct filters for the session. This function/group association can be shared with the NRF and hence help subsequently guide function selection auto-matically. In additional embodiments, the profiling by the platform may lead to isolated slice allocation and/or map-ping of each of the functions 314 to a correct cell/zone.

In deployment 300 of FIG. 3B of the multilayer local network, a function is not deployed within the first cell (C1). This may be the case for a variety of reasons. For instance, having a function in every layer as well as within each cell/zone may add cost and complexity and hence a function may not always be present in a given cell/zone. In addition, a given session for a client device may have specific service requirements and not all functions 314 may be capable of supporting those requirements. Therefore, while the first function 314-1 may still exist for C1, it may not be able to satisfy the service requirements for the session of the first client device 310-1. Similarly, the best function for a sta-tionary client device may not be the best function for a mobile client device. Regardless of why the first function 314-1 to first client device 310-1 relationship is not available or is not optimal or appropriate, execution of function selection process 248 may provide additional flexibility in function location and selection in a manner that accounts for these discrepancies.

For example, since in deployment 300 of FIG. 3B C1 no longer contains first function 314-1, first client device 310-1 may instead be connected to the third function 314-3 in Industrial Zone Layer 308c. From a security point of view, this may be problematic since there are certain security requirements imposed on communication to, from, and/or within C1. Some of these security requirements may be supported by a firewall between C1 and the Industrial Zone Layer 308c.

However, not only are each of the client devices 310 associated with a respective functions and with a respective layer, cell, and/or zone, but the security requirements that must be met for the traffic of the client devices 310 are profiled. Hence, the NF profile for each of the functions 314 are modified to include the security services that they support (e.g., natively, via service chaining, etc.) in the NRF. For instance, in order for the third function 314-3 to be selected as the function for establishing an IP session (e.g., which may occur when the first client device 310-1 connects to the network initially to obtain an IP-address) with the first client device 310-1, which may ultimately be used to accom-modate a communication session 316 between the first client device 310-1 and a particular endpoint device 306c in C1, it must first be determined that the third function 314-3 supports the security services required to be imposed on this type of is communication by comparing those requirements to the security services supported by the third function 314-3 as included in the NRF. In various embodiments, the third function 314-3 may satisfy the requirements utilizing a firewall module associated with the third function 314-3, but a variety of security services could of course be required and therefore implemented by the third function 314-3.

This approach may effectively allow for a distributed implementation of a cells data plane and associated security functions. This, in turn, may enable fewer functions to be deployed as well as the selection of more optimally located functions for mobile client devices 310. In this approach, IP addressing may be handled by allocating a portion (e.g., a subnet) of the cell's IP address space to a function (e.g., a new subnet).

Similarly, to effectively extend the cell's network to a function, a VxLAN or other tunneling mechanism may be used. In such examples, the traffic from the function may not be subjected to the security services (e.g., firewall, etc.) that other cell-external traffic is subjected to since the function will have already performed the required security services.

As previously mentioned, the functions 314 may be 5G functions with UPFs being prominently discussed. However, the described techniques are also applicable to the selection of other 5G functions. For example, these techniques may be utilized to select a session management function (SMF), access and mobility management function (AMF), etc. While placement of SMF, AMF, and/or other functions may be less critical than UPF functions since they are associated with process signaling rather than user plane traffic, selec-tion among the available instances using these techniques may still optimize the client device connections with respect to proximity, service requirements, security requirements, etc. in the same manner as with UPF selection.

Figure 4:
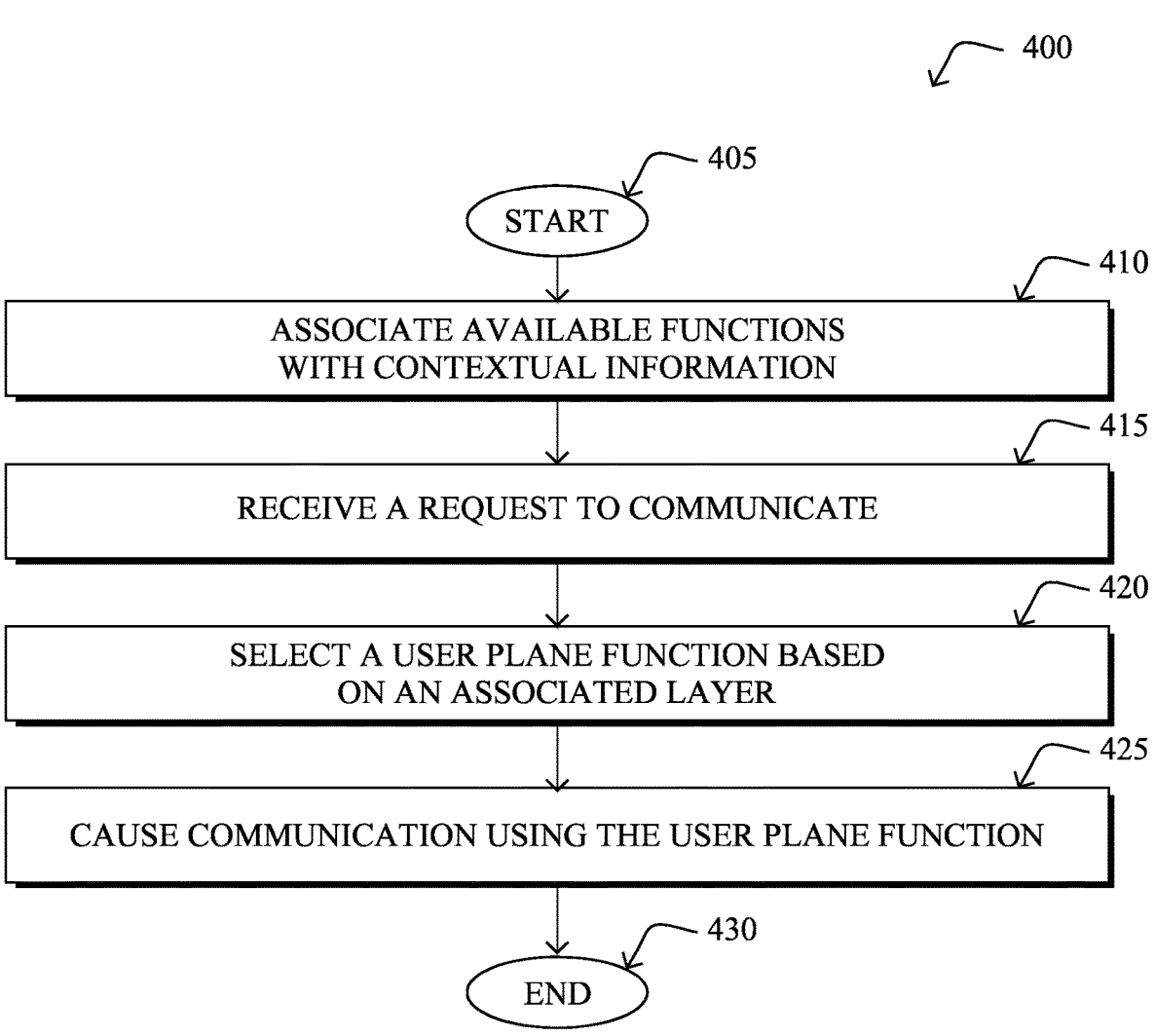
FIG. 4 illustrates an example of a simplified procedure for function selection in an industrial network.

FIG. 4 illustrates an example of a simplified procedure for function selection in industrial networks in accordance with one or more embodiments described herein. For example, a non-generic, specifically configured device (e.g., device 200) may perform procedure 400 by executing stored instructions (e.g., function selection process 248). The pro-cedure 400 may start at step 405, and continues to step 410, where, as described is in greater detail above, a device may associate available 5G functions, stored by a network reposi-tory function, with contextual information. The contextual information may map each of the available 5G functions with a layer of a hierarchical security model for an industrial network.

The hierarchical security model may be a multilayered security model. In various embodiments, the hierarchical security model may be a Purdue Model or IEC 62443 model. The hierarchical security model may be based in part on deep packet inspection of traffic associated with endpoints within the industrial network.

At step 415, as detailed above, the device may receive a request from a user equipment endpoint to establish an IP session with the industrial network. For example, a given client device may belong to a given cell/zone which has certain security requirements for devices in the cell/zone when communicating with devices in other cells/zones. Normally, the IEC-62443 conduit will implement those security policies, but with the 5G UPF, traffic may effectively have already "left the zone", and hence we want to make sure the UPF selected still satisfies the security polices for the client device in that cell/zone. Once the user equipment endpoint established the IP session with the appropriate user plane function, then the user equipment endpoint may communicate via the industrial network. For example, the user equipment endpoint may communicate with an actuator, sensor, automated industrial equipment, etc. via the industrial network upon establishing the IP session with the user plane function. The communication may be facilitated by the user plane function. The user equipment endpoint may include a 5G client device.

At step 420, the device may select a particular user plane function from among the available 5G functions for use by the user endpoint. In various embodiments, a session management function executing on the device may select the user plane function based on security requirements. The selection may be based in part of the layer of the hierarchical security model associated with the particular user plane function. In various embodiments, the device may cause the particular user plane function to be configured with a security policy based on the hierarchical security model. The security policy may restrict traffic associated with the user equipment endpoint to a particular cell within a is given layer of the hierarchical security model.

The particular user plane function may be selected from among the available 5G functions for use based in part on the particular user plane function natively supporting required security services applicable to traffic associated with the user equipment endpoint. More specifically, the particular user plane function may be selected from among the available 5G functions for use based in part on the particular user plane function natively supporting required security services applicable to devices in a particular zone of the industrial network traffic associated with the user equipment endpoint. That is, in IEC-62443 terms, the security requirements for the devices within the same zone (e.g., cell, area, zone, etc.) of the user equipment endpoint may be analyzed to determine the required security services applicable to the devices within that zone.

The particular user plane function may be selected from among the available 5G functions for use based in part on the particular user plane function supporting required security services applicable to traffic associated with the user equipment endpoint via service chaining. More specifically, the particular user plane function may be selected from among the available 5G functions for use based in part on the particular user plane function supporting required security services applicable to traffic associated with devices in a particular zone of the industrial network via service chaining. Again, in IEC-62443 terms, the security requirements for the devices within the same zone (e.g., cell, area, zone, etc.) of the user equipment endpoint may be analyzed to determine the required security services applicable to the devices within that zone.

In various embodiments, the particular user plane function may be selected from among the available 5G functions for use based in part on its ability to satisfy service requirements associated traffic associated with the user equipment endpoint. In addition, the particular user plane function may be selected from among the available 5G functions for use based in part on the particular user plane function being closest to the user equipment endpoint. The particular user plane function may be selected from among the available 5G functions for use based in part on the particular user plane function being optimized for a type of the user equipment endpoint (e.g., mobile, stationary, etc.).

At step 425, as detailed above, the device may cause the user equipment endpoint to communicate via the industrial network using the particular user plane function. In various embodiments, the device may utilize a tunneling mechanism to deliver traffic from the particular user plane function to a particular cell of the industrial network. The traffic delivered from the particular user plane function to the particular cell of the industrial network by the tunneling mechanism may be exempted from security services applicable to other cell-external traffic. This may be the case when, for example, the user plane function selected for delivery of the traffic using the tunnel is configured with its own security service modules which subject the traffic to required security services prior to delivery of the traffic to the particular cell.

Procedure 400 then ends at step 430.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, certain steps from procedure 400 may be incorporated into other procedures.

The techniques described herein, therefore, provide a mechanism to deploy 5G functions in accordance with the IEC 62443 model, supporting the cell/zone model and associated security controls per level. This mechanism allows for selection and deployment of, for example, UPFs that facilitate user endpoint connections and communication across the multiple layers of a hierarchical security model in a manner that honor service requirements, security requirements, etc. and that is optimized for proximity, device type, etc. As a result, fewer UPF functions can be deployed, interconnectivity between private 5G deployments and IIoT networks is increased, this interconnectivity can be accomplished with reduced service impacts and security control failures, and/or network devices can communicate and operate more efficiently and with reduced resource consumption.

While there have been shown and described illustrative embodiments that is function selection in industrial networks, it is to be understood that various other adaptations and modifications may be made within the spirit and scope of the embodiments herein. For example, while certain embodiments are described herein with respect to using certain functions, certain hierarchical security models, etc., the functions, hierarchical security models, etc. are not limited as such and other functions, hierarchical security models, etc. are contemplated in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   associating, by a device, available 5G functions stored by a network repository function with contextual information, wherein the contextual information maps each of the available 5G functions with a layer of a hierarchical security model topology for an industrial network within which that available 5G function is deployed;
   receiving, at the device, a request from a user equipment endpoint to communicate via the industrial network;
   selecting, by the device, a particular user plane function from among the available 5G functions for use by the user equipment endpoint based in part on the layer of the hierarchical security model associated with the particular user plane function; and
   causing, by the device, the user equipment endpoint to communicate via the industrial network using the particular user plane function.

2. The method of claim 1, wherein the hierarchical security model is a Purdue Model or IEC 62443 Model.

3. The method of claim 1, wherein the user equipment endpoint communicates with an actuator or sensor via the industrial network.

4. The method of claim 1, further comprising:
   causing the particular user plane function to be configured with a security policy based on the hierarchical security model.

5. The method of claim 4, wherein the security policy restricts traffic associated with the user equipment endpoint to a particular cell within a given layer of the hierarchical security model.

6. The method of claim 1, further comprising:
   utilizing a tunneling mechanism to deliver traffic from the particular user plane function to a particular cell of the industrial network.

7. The method of claim 6, further comprising:
   exempting the traffic delivered from the particular user plane function to the particular cell of the industrial network by the tunneling mechanism from security services applicable to other cell-external traffic.

8. The method of claim 1, wherein the hierarchical security model is based in part on deep packet inspection of traffic associated with endpoints within the industrial network.

9. The method of claim 1, wherein the particular user plane function is selected from among the available 5G functions for use based in part on the particular user plane function natively supporting required security services applicable to traffic associated with the user equipment endpoint.

10. The method of claim 1, wherein the particular user plane function is selected from among the available 5G functions for use based in part on the particular user plane function supporting required security services applicable to traffic associated with the user equipment endpoint via service chaining.

11. An apparatus, comprising:
    one or more network interfaces;
    a processor coupled to the one or more network interfaces and configured to execute one or more processes; and
    a memory configured to store a process that is executable by the processor, the process when executed configured to:

associate available 5G functions stored by a network repository function with contextual information, wherein the contextual information maps each of the available 5G functions with a layer of a hierarchical security model topology for an industrial network within which that available 5G function is deployed;
   receive a request from a user equipment endpoint to communicate via the industrial network;
   select a particular user plane function from among the available 5G functions for use by the user equipment endpoint based in part on the layer of the hierarchical security model associated with the particular user plane function; and
   cause the user equipment endpoint to communicate via the industrial network using the particular user plane function.

12. The apparatus of claim 11, wherein the hierarchical security model is a Purdue Model or IEC 62443 Model.

13. The apparatus of claim 11, wherein the user equipment endpoint communicates with an actuator or sensor via the industrial network.

14. The apparatus of claim 11, wherein the process when executed is further configured to:
    cause the particular user plane function to be configured with a security policy based on the hierarchical security model.

15. The apparatus of claim 14, wherein the security policy restricts traffic associated with the user equipment endpoint to a particular cell within a given layer of the hierarchical security model.

16. The apparatus of claim 11, wherein the process when executed is further configured to:
    utilize a tunneling mechanism to deliver traffic from the particular user plane function to a particular cell of the industrial network.

17. The apparatus of claim 16, wherein the process when executed is further configured to:
    exempt the traffic delivered from the particular user plane function to the particular cell of the industrial network by the tunneling mechanism from security services applicable to other cell-external traffic.

18. The apparatus of claim 11, wherein the hierarchical security model is based in part on deep packet inspection of traffic associated with endpoints within the industrial network.

19. The apparatus of claim 11, wherein the particular user plane function is selected from among the available 5G functions for use based in part on the particular user plane function natively supporting required security services applicable to traffic associated with the user equipment endpoint.

20. A tangible, non-transitory, computer-readable medium storing program instructions that cause a device to execute a process comprising:
    associating, by the device, available 5G functions stored by a network repository function with contextual information, wherein the contextual information maps each of the available 5G functions with a layer of a hierarchical security model topology for an industrial network within which that available 5G function is deployed;
    receiving, at the device, a request from a user equipment endpoint to communicate via the industrial network;
    selecting, by the device, a particular user plane function from among the available 5G functions for use by the user equipment endpoint based in part on the layer of the hierarchical security model associated with the particular user plane function; and causing, by the device, the user equipment endpoint to communicate via the industrial network using the particular user plane function.

* * * * *